Jan. 11, 1927. 1,613,762
R. H. McCOY
BEARING AND AUTOMATIC TIGHTENING MEANS THEREFOR
Filed March 2, 1926   2 Sheets-Sheet 1
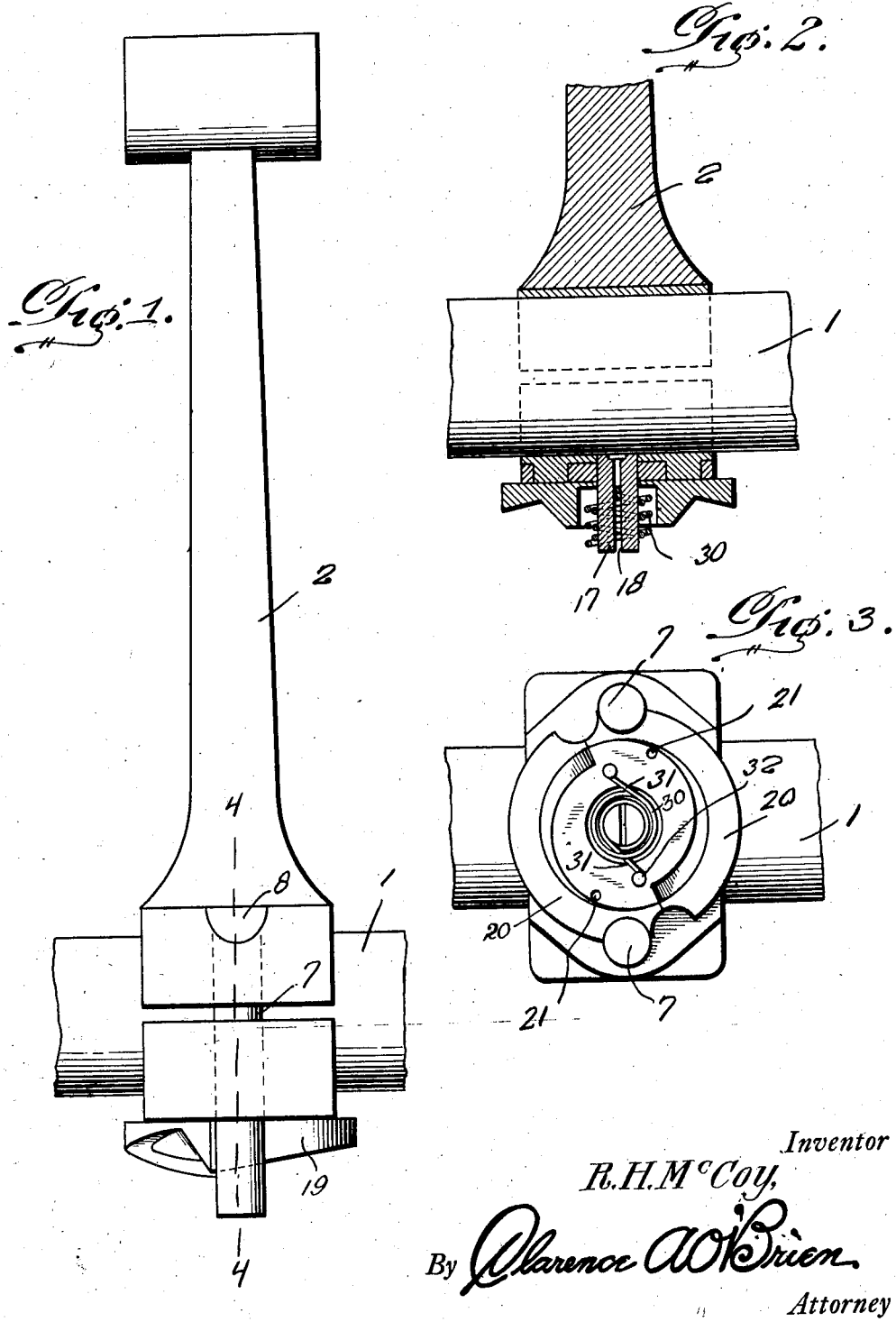
Inventor
R. H. McCoy,
By Clarence A. O'Brien
Attorney

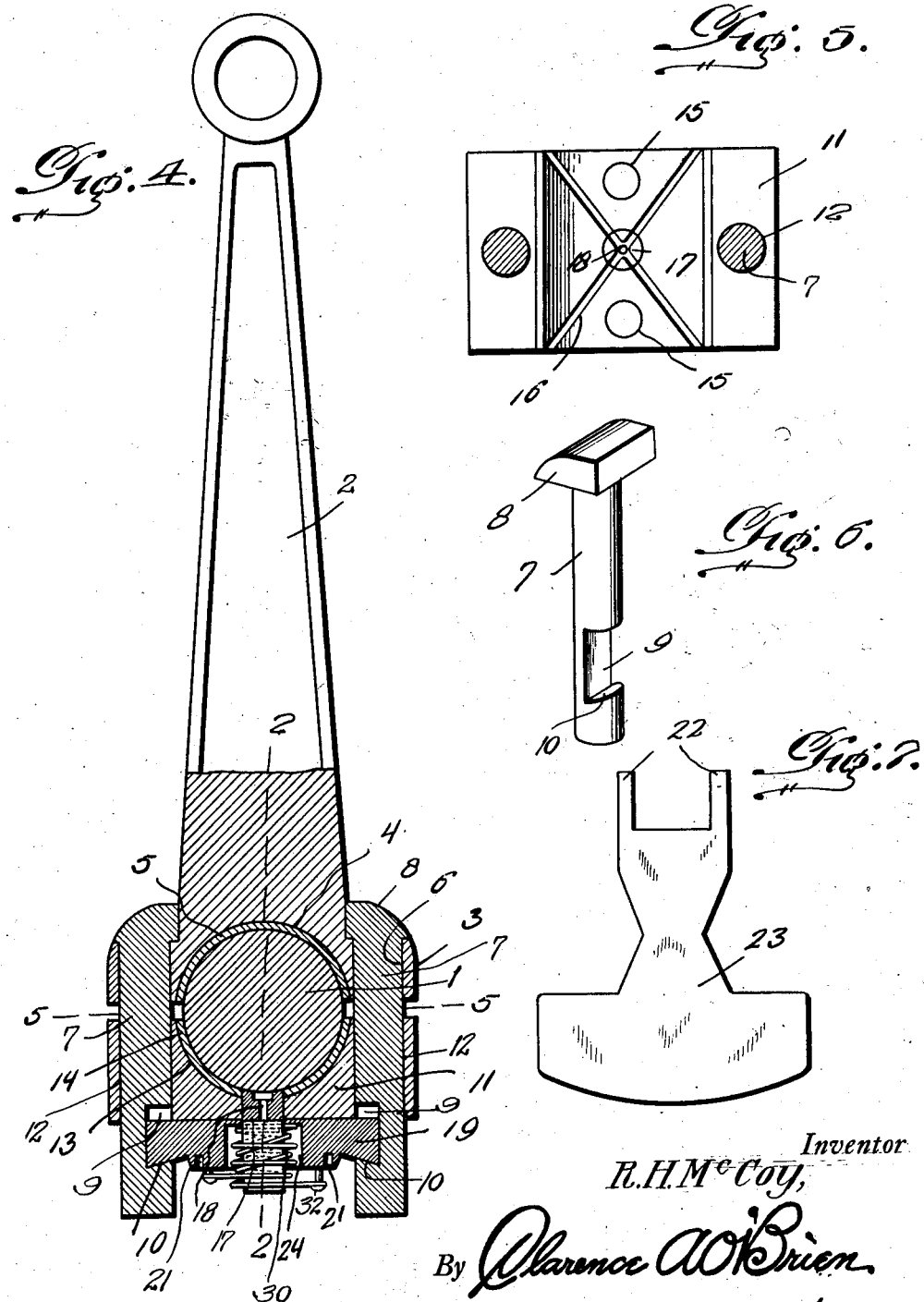

Patented Jan. 11, 1927.

1,613,762

UNITED STATES PATENT OFFICE.

ROBERT HARRY McCOY, OF SALT LAKE CITY, UTAH.

BEARING AND AUTOMATIC TIGHTENING MEANS THEREFOR.

Application filed March 2, 1926. Serial No. 91,705.

My present invention has to do with split bearings for use in various relations; and it contemplates the provision of a split bearing embodying advantageous means for automatically tightening the bearing or taking up wear of the parts thereof.

Other objects and practical advantages of the invention will be fully understood from the following description and claims when the same are read in connection with the drawings, accompanying and forming part of this specification, in which:—

Figure 1 is an elevation illustrative of a split bearing equipped with the construction constituting the best practical embodiment of my invention of which I am cognizant.

Figure 2 is a fragmentary section taken in the plane indicated by the line 2—2 of Figure 4, and showing a shaft in elevation in the bearing.

Figure 3 is an inverted plan view of the improvement as shown in Figure 1.

Figure 4 is a view taken at right angles to Figure 1 and partly in elevation and partly in section, the sectional part being taken in the plane indicated by the line 4—4 of Figure 1.

Figure 5 is a horizontal section taken in the plane indicated by the line 5—5 of Figure 4 and showing the chief member of my improvement in plan.

Figure 6 is a detail perspective of one of the bolts comprised in my improvement.

Figure 7 shows in elevation a wrench for use in conjunction with the bearing as hereinafter explicitly pointed out.

Similar numerals of reference designate corresponding parts in all of the views of the drawings.

The shaft shown in Figures 1 to 4 is designated by 1, and in association with said shaft I show by way of example a pitman rod 2 having at its end adjacent to the shaft an enlargement 3 and also having a portion 4 curved in conformity to the shaft and designed to be lined with Babbitt metal 5 or other appropriate means. The enlargement 3 is apertured as designated by 6 for the passage of the shanks of bolts 7, the said bolts being headed at 8 and being recessed at 9 and having the lower end walls of the recesses 9 inclined as designated by 10 and definitely illustrated in Figure 4. The lower member or seat member of the bearing is designated by 11 and is apertured at 12 for the passage of the shanks of the bolts 7, and is shaped as designated by 13 to conform to the shaft and has its concave portion 13 lined by Babbitt metal 14 or other appropriate means. The member 11 is provided at 15 with apertures to receive key portions of the Babbitt metal 14, and is also provided with crossed oil channels 16 which communicate at their point of intersection with an oil duct or conduit which extends through a pin 17 carried by the member 11, the said oil duct or conduit being designated by 18 and best shown in Figures 2, 4 and 5.

Surrounding and turnable about the pin 17 is the cam member 19 of my improvement, the said cam member 19 having reversely arranged curvilinear cams 20, disposed in the recesses 9 of the bolts 7 and opposed to the inclined walls 10 of said recesses 9, and also having by preference but not necessarily, apertures such as 21 in Figures 3 and 4 for the reception of the spaced portions 22 of a wrench 23 such as illustrated in Figure 7.

The cam member 19 is chambered as designated by 24, and in the said chamber 24 and about the pin 17 is arranged the coiled major portion of the spring 30 of my improvement, the said spring 30 having the coiled intermediate portion alluded to and also having arms 31 engaged with pendent projections 32 on the cam member 19 after the manner best shown in Figures 3 and 4.

In the assembly of the parts of my improvement, the bolts 7 are placed as illustrated. The member 19 is then associated with the member 11, and the member 19 is given approximately a half turn through the medium of the wrench 23 in an anticlockwise direction, and the member 11 and the member 19 are then placed together on the bolts 7 with the reversely arranged cams 20 of the member 19 in the recesses 9 of the bolts 7, whereupon the improvement will be in a state to automatically take up wear and tighten the bearing.

It will be apparent from the foregoing that my improvement is at once simple, efficient and compact; also, that said improvement is susceptible of employment to advantage in large and small bearings; that said improvement may be depended upon to avert knocks and to prolong the usefulness of a bearing; and that the improvement obviates the necessity of mechanical or manual adjustment; and that by virtue of the improvement the efficiency of the bearing is maintained for an indefinite period of time.

While I prefer the illustrated and preferred embodiment of my invention I do not desire to be understood as limiting myself to the precise construction and relative arrangement of the elements, my invention being defined by my appended claims within the scope of which modifications in structure and in arrangement may be made without departure from my invention.

Having described my invention, what I claim and desire to secure by Letters-Patent, is:—

1. In a bearing and in combination, an apertured bearing portion for use at one side of a shaft, bolts having shanks extended through the apertures of said portion and also having on their shanks lateral projections the sides of which are inclined, an apertured bearing member opposed to said apertured portion and receiving in its apertures the shanks of said bolts, a chambered cam member of turnable type arranged at the opposite side of said apertured member to said apertured portion and having reversely arranged curvilinear cams disposed in engagement with said projection sides of the bolts, a pin on the apertured member, and spring means surrounding said pin and having an intermediate portion disposed in the chamber of said cam member and also having arms engaging projections on the cam member; said cam member also having apertures to receive wrench portions.

2. In a bearing and in combination, an apertured bearing portion for use at one side of a shaft, bolts having shanks extended through the apertures of said portion and also having on their shanks lateral projections, the sides of which are inclined, an apertured bearing member opposed to said apertured portion and receiving in its apertures the shank of said bolts, a chambered cam member of turnable type arranged at the opposite side of said apertured member to said apertured portion and having reversely arranged curvilinear cams disposed in engagement with said projection sides of the bolts, a pin on the apertured member, and spring means surrounding said pin and having an intermediate portion disposed in the chamber of said cam member and also having arms engaging projections on the cam member; said cam member also having apertures to receive wrench portions, and said apertured portion and apertured member being shaped to seek and conform to a shaft interposed between the same, and the apertured member being provided with keyseats for Babbitt metal and being also provided with crossed channels for oil and a duct or conduit communicating with said channels at the point of intersection and extending through the said pin of the apertured member.

3. In a bearing and in combination, a bearing portion for use at one side of a shaft, guide means carried by said portion, said guide means including opposite elements having lateral projections, a bearing member for use at the opposite side of the shaft and movable with respect to said bearing portion, a turnable cam member backing said movable member and having reversely arranged cams disposed in engagement with said lateral projections of the guide means elements, and a tension spring cooperating with said cam member for the turning of the same in engagement with the elements of the guide means.

4. In a bearing and in combination, a bearing portion for use at one side of a shaft, guide means carried by said portion, said guide means including opposite elements having shanks and lateral projections on said shanks, a bearing member for use at the opposite side of the shaft and movable with respect to said portion, a turnable cam member backing said movable member and having reversely arranged cams disposed in engagement with said projections of the guide means elements, and a tension spring cooperating with said cam member for the turning of the same in engagement with the projections on the elements of the guide means; the said movable member being provided with a pin, and the said cam member being chambered and receiving said pin in its chamber, and the said spring having an intermediate portion disposed in said chamber and about said pin and also having arms in engagement with projections on the cam member.

In testimony whereof I affix my signature.

ROBERT HARRY McCOY.